United States Patent [19]
Patterson et al.

[11] Patent Number: 5,524,501
[45] Date of Patent: Jun. 11, 1996

[54] DETENT SPRING FOR ROTATABLE GRIP ACTUATING SYSTEM

[75] Inventors: Sam Patterson, Solana Beach, Calif.;
John D. Cheever, Chicago, Ill.;
Michael W. Larson, Chicago, Ill.;
Tymme A. Laun, Chicago, Ill.;
William M. Yaney, Sun City, Calif.

[73] Assignee: SRAM Corporation, Chicago, Ill.

[21] Appl. No.: 295,370

[22] Filed: Aug. 24, 1994

Related U.S. Application Data

[63] Continuation-in-part of Ser. No. 207,249, Mar. 7, 1994, Pat. No. 5,476,019.

[51] Int. Cl.$^6$ .............................. G05G 5/06; B62K 23/04
[52] U.S. Cl. .................. 74/475; 74/489; 74/506; 74/527
[58] Field of Search ..................... 74/475, 489, 506, 74/527

[56] References Cited

U.S. PATENT DOCUMENTS

| | | |
|---|---|---|
| 1,231,055 | 6/1917 | Packard . |
| 2,153,430 | 4/1939 | Newman ............................. 74/527 X |
| 2,626,335 | 1/1953 | Landin ............................... 74/527 X |
| 3,020,778 | 2/1962 | Davidson ............................... 74/489 |
| 3,218,879 | 11/1965 | Reed ........................................ 74/489 |
| 3,489,029 | 1/1970 | Cappelle et al. ......................... 74/527 |
| 3,522,745 | 8/1970 | Milosevic ............................... 74/489 |
| 4,055,093 | 10/1977 | Ross ........................................ 74/501 |
| 4,191,065 | 3/1980 | Golobay et al. ........................ 74/489 |
| 4,201,095 | 5/1980 | Cirami ................................... 74/217 |
| 4,267,744 | 5/1981 | Yamasaki ................................. 74/475 |
| 4,384,864 | 5/1983 | Bonnard ................................. 474/82 |
| 4,526,056 | 7/1985 | Yamanaka ................................ 74/489 |
| 4,548,092 | 10/1985 | Strong ................................... 74/475 |
| 4,619,154 | 10/1986 | Yamanakan ........................... 74/489 |
| 4,900,291 | 2/1990 | Patterson ............................... 474/80 |
| 4,938,733 | 7/1990 | Patterson ............................... 474/80 |
| 5,102,372 | 4/1992 | Patterson ............................... 474/80 |
| 5,134,897 | 8/1992 | Romano ................................. 74/489 |
| 5,186,071 | 2/1993 | Iwasaki ................................. 74/489 |
| 5,197,927 | 3/1993 | Patterson ............................... 474/80 |
| 5,241,877 | 9/1993 | Chen ..................................... 74/489 |
| 5,261,858 | 11/1993 | Browning ............................... 474/69 |

FOREIGN PATENT DOCUMENTS

| | | |
|---|---|---|
| 0294720 | 6/1988 | European Pat. Off. . |
| 0523257 | 2/1992 | European Pat. Off. . |
| 0529664 | 8/1992 | European Pat. Off. . |
| 0566025 | 4/1993 | European Pat. Off. . |
| 0566024 | 4/1993 | European Pat. Off. . |
| 0585473 | 9/1993 | European Pat. Off. . |
| 7210452 | 3/1973 | France . |
| 7246272 | 7/1974 | France . |
| 9000359 | 4/1992 | France . |
| 3317382 | 11/1984 | Germany . |
| 3938454 | 5/1991 | Germany . |
| 9210488 | 11/1992 | Japan . |
| 5-32191 | 8/1993 | Japan . |
| 9402348 | 2/1994 | Japan . |
| 667244 | 8/1985 | Switzerland . |
| 2024381 | 1/1980 | United Kingdom . |

*Primary Examiner*—Allan D. Herrmann
*Attorney, Agent, or Firm*—Jefferson Perkins

[57] ABSTRACT

A detent spring for use in a rotatable grip actuating system for a Bowden tube motion translation system used to actuate a derailleur gear shifting system on a bicycle. The detent spring, which is formed of spring type metal has a U-shape, with one leg positioned in an elongated arcuate slot in a first member which rotates within a second member having notches on an inner surface which are engaged by a detent formed on the second leg of the spring.

31 Claims, 5 Drawing Sheets

DETENT SPRING FOR ROTATABLE GRIP ACTUATING SYSTEM

CROSS-REFERENCE TO RELATED APPLICATION

This application is a Continuation-In-Part of application Ser. No. 08/207,249, filed Mar. 7, 1994 now U.S. Pat. No. 5,476,019.

BACKGROUND OF THE INVENTION

1. Field of the Invention

This invention relates to a rotatable grip actuating system for use with a Bowden tube (cable within a tube) type motion translation system. More particularly, it relates to a detent spring for use in a rotatable grip actuating system designed for operating a derailleur gear shifting system on a bicycle.

2. Description of Related Art Including Information Disclosed Under 37 CFR §1.97 & 1.98

One type of shift actuator that is conveniently rotatably mounted on a handlebar and positioned so as not the require the rider to remove a hand for the customary handlebar grip to operate the actuator is disclosed in U.S. Pat. No. 5,102,372 issued Apr. 7, 1992 to three of the co-inventors of this application and assigned to the assignee of this application. Copending application Ser. No. 08/207,249, filed Mar. 7, 1994, now U.S. Pat. No. 5,476,019 of which this application is a Continuation-In-Part, and which is also assigned to the Assignee of this application, sets for an improvement in the actuating system set forth in U.S. Pat. No. 5,102,372. The improvement set forth in the co-pending application is in part directed to maximizing the mechanical advantage of a rotatable grip actuating system by minimizing the radius at which the cable is pulled. For the purpose of providing a full teaching of the construction and operating requirements of bicycle derailleur-type shifting systems, and particularly ones operated by a rotatable grip actuating system, the above-mentioned patent and co-pending patent application are incorporated herein by reference.

The rotatable grip actuating systems set forth in the above-cited patent and co-pending patent application, each have two principal components which are rotatable with respect to each other. Notches are provided in facing circumferential surfaces of the two principal components. These notches cooperate with a spring to establish predetermined positions of the two principal components with respect to each other. The predetermined positions correspond to predetermined shifted positions of the derailleur chain.

Figure 1:
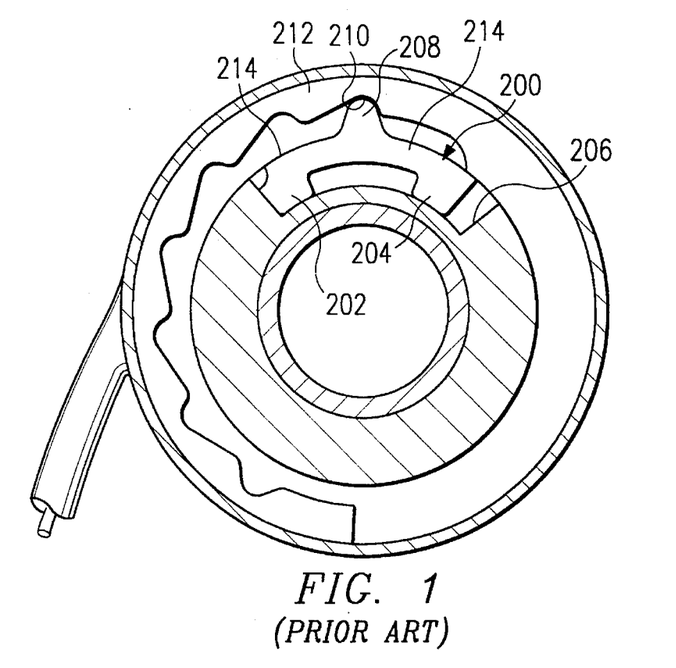
FIG. 1 a cross-sectional view of a rotatable grip actuating system for a derailleur gear shifting system on a bicycle showing a plastic detent spring in accordance with the prior art.
Figure 2:
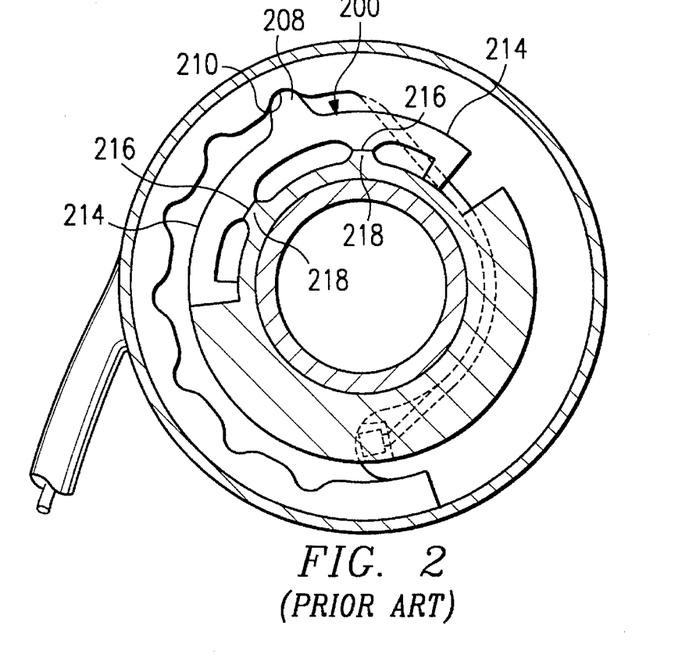
FIG. 2 is a cross-sectional view of a rotatable grip actuating system for a derailleur gear shifting system on a bicycle showing another embodiment of a plastic detent spring in accordance with the prior art.

As shown in the patent, and FIGS. 1 and 2 of this application, the spring has in the past been formed as a plastic member. Referring to FIG. 1, the prior art plastic spring 200 has feet 202 and 204 located in a spring cavity 206, and an indexing projection 208 engaged in a detent notch 210 in the detent notch circle 212. The detent notches 210 have a differential between the angle on the cable release side of the detent notch and on the cable pull side. This differential in angles was provided to substantially balance out the torque required to rotate the grip out of a detent notch, since the cable tension provided by the derailleur mechanism naturally pulls the rotational grip in the direction of cable release.

As can be seen in FIG. 1, there are space limitations for accomplishing the detent action. The curvature of the handlebar and the curvature of the detent notch circle leaves a predetermined narrow arcuate space. Thus, it was found necessary to use a leaf spring in that space to provide the detent action, and a plastic leaf spring was first chosen. It has been found that the plastic spring 200, when left with the indexing projection or detent 208 between the notches, tends to deform plastically because of cold flow of the plastic caused by the continuous stress. That is, when the detent 208 is positioned between notches, it is pushed toward the center of the grip, with the leaf portions 214 being flattened. This deformation can result in the loss of the preload contact force between the detents 208 and the notches 210. The torque required to release a detent 208 is a function of the spring preload, contact angles and the stiffness of the leaf portions 214 of the plastic spring. If the preload force of the spring is significantly reduced, the release torque is also significantly reduced.

In another embodiment of the prior art as shown in FIG. 2, the leaf portions 214 of the plastic spring 200 are supported, when the detent 208 is in a notch 210, by a pair of feet 216 which engage a correspondingly located pair of projections 218 in the cavity 206. This embodiment was intended to maintain the preload force on the spring when the detent 208 was in a notch 210.

SUMMARY OF THE INVENTION

It is an object of this invention to provide a rotatable grip type actuating system with an improved detent spring which overcomes shortcomings of previously used plastic leaf springs. It is a further object of this invention, in a preferred embodiment thereof, to provide a detent spring made of a spring type metal, which is formed such that the indexing projection or detent on the spring is not a location of maximum stress in the spring. It is a further object of this invention to form a detent spring made of a spring type metal such that the action of the detent with respect to the foot of the spring is asymmetrical. Thus providing differing actuating torques for opposite directions of rotation when interacting with a detent notch circle provided with symmetrical notches. It is a still further object of this invention to provide a detent spring which is readily made of a spring type metal and assembled in a rotatable grip actuating mechanism for a bicycle derailleur-type shifting system.

In accordance with a first embodiment of this invention, a detent spring assembly of a rotatable grip actuating system includes a detent spring which is made of a spring type metal and formed with an elongated base having first and second ends, and with an arm extending from the first end, which extends over the elongated base. The free end of the arm is bent to provide a notch engaging portion or detent having an apex which extends in a direction away from the base. A first member has a cylindrical surface in which is formed an elongated notch for retaining the base of a detent spring. A second member rotatable with respect to the first member has a second generally cylindrical surface located radially outward from the first surface. A series of spaced notches are formed in the second surface which may be engaged by the detent or notch engaging portion of the spring as the second member is rotated with respect to the first member. By choosing the material and cross-sectional thickness of the spring metal of which the spring is formed, and by choosing the geometry of the spring and that of the notches, the force required to rotate the second member with respect to the first may be determined. Further, due to the geometry of the spring, the forces required to rotate in opposite directions may be made different so as to compensate for the return spring force on the derailleur operating cable, thus equalizing the torque which must be applied to rotate the second member in either direction. In another embodiment of this invention, the spring, while of the same general shape as the spring of the first embodiment, is formed instead of an elongated length of cylindrical spring wire.

DETAILED DESCRIPTION OF THE PREFERRED EMBODIMENTS

Figure 3:
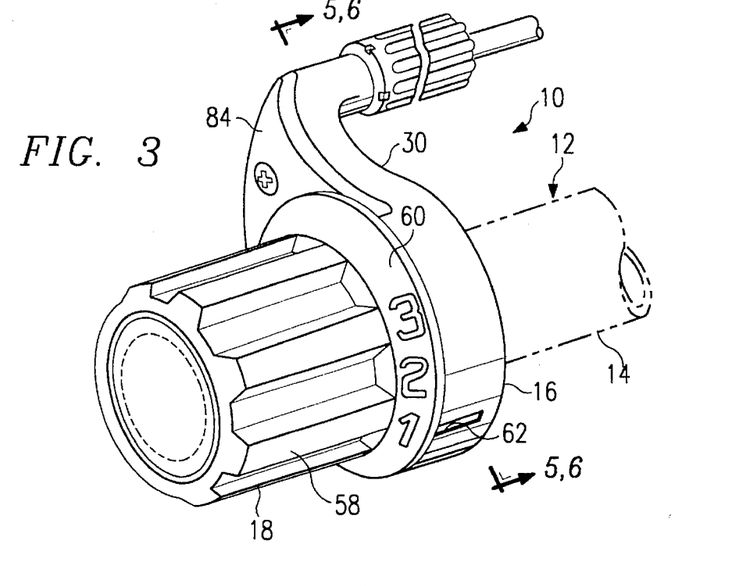
FIG. 3 is an isometric view of a rotatable grip actuating system for a derailleur gear shifting system on a bicycle, in which a metal detent spring in accordance with this invention is employed.
Figure 4:
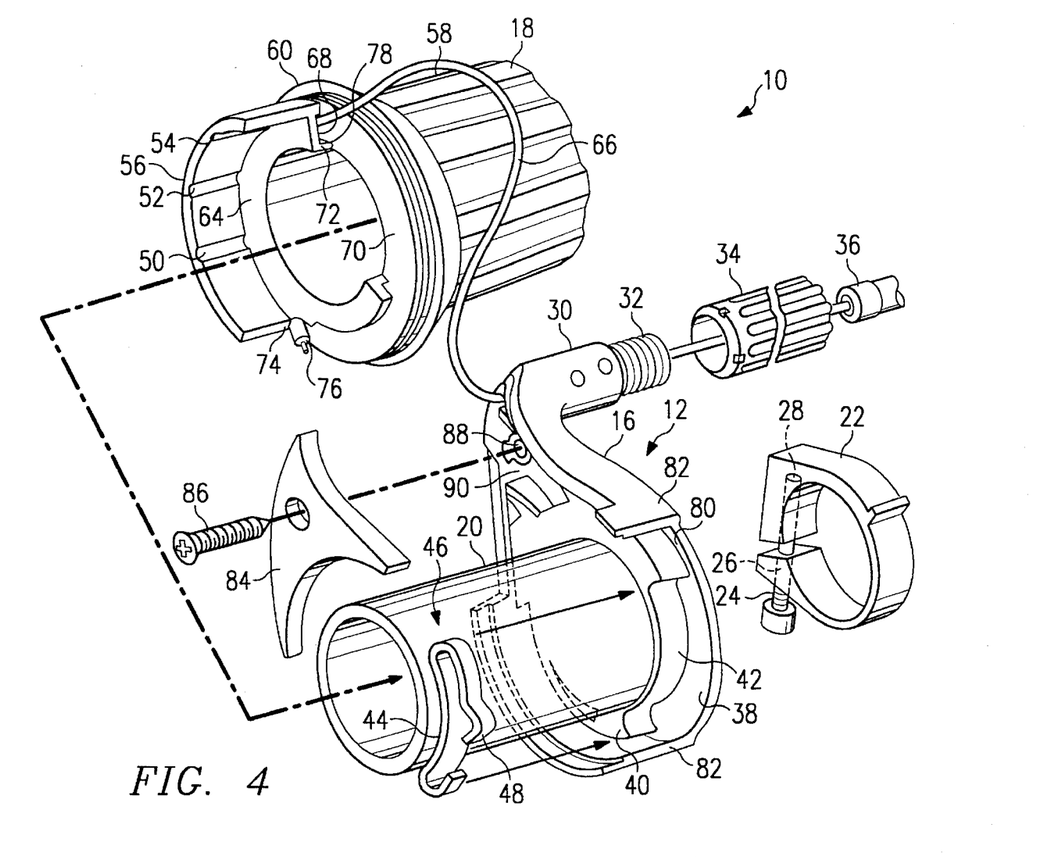
FIG. 4 is an exploded isometric view of the rotatable grip actuating system shown in FIG. 3, incorporating a metal detent spring in accordance with a first embodiment of this invention.

Referring to FIGS. 3 and 4, the components on a rotatable grip actuating system and their assembly, including a detent spring 46 in accordance with a first embodiment of this invention will be described. A rotatable grip actuating system 10 is placed over a handlebar 12. The portion of the handlebar 14 shown projecting to the right in FIG. 3, is connected to the bicycle handlebar stem (not shown). The handlebar 12 also projects to the left of the system 10 as shown in FIG. 3 to support the customary handgrip normally place at the end of the handlebar.

The system 10 has two principal components, a housing 16 secured to the handlebar 12 and a rotatable grip 18. The housing 16 includes an elongated tube or mandrel 20 which is received in a snug fit over the handlebar 12. The housing 16 is formed with a pocket (not shown) on the right side as viewed in FIG. 3 for receiving a U-shaped clamp 22 which secures the housing 16 to the handlebar 12. The clamp 22 is secured to the handlebar by a bolt 24 which loosely passes through a hole 26 in one leg of the clamp and engages threads in a hole 28 provided in the other leg of the clamp.

Formed as a portion of the housing 16 is a cable guide tube 30. The guide tube 30 is provided at its distal end with external threads 32 for mating with internal threads provided on a coupler 34. The coupler 34 secures a cable tube 36 to the cable guide tube 30. Surrounding the mandrel 20, next to a radially extending wall 38 of the housing 16 is a spring retaining portion 40.

Formed in a generally cylindrical surface of the spring retaining portion 40 is an elongated notch 42 which captures a first portion 44 of a formed spring 46, a second portion of which formed spring cooperates with the rotatable grip 18 to define selected positions of the rotatable grip 18. First portion 44 of spring 46 rests in the notch 42, while a convex bend or detent 48 in the second portion of the spring is engageable in notches 50, 52 and 54 formed on the inner generally cylindrical or circumferential surface of wall 56 of the rotatable grip 18. As will be further described with respect to FIG. 5 and 6, the interaction of the detent 48 of spring 46 with the notches 50, 52 and 54 defines positions of the rotatable grip 18 with respect to the housing 16 which correspond to desired engagement positions of the derailleur shifting mechanism.

The rotatable grip 18 is formed with an external grip portion 58 and an adjoining enlarged portion 60 on which may be printed numerals, shown as 1, 2 and 3 in FIG. 1, which when located with respect to an index mark 62 on the housing 10 define three operating positions of the handgrip assembly. Extending to the left of the grip portion 58, as viewed in FIG. 4, is not only the wall 56, but also a cable retaining and engaging portion 64 of rotatable grip 18. An operating cable 66 is retained behind a radially extending wall portion 68 of portion 64 and a radial extending face 70 of the enlarged portion 60. The operating cable rests upon a spool 72 of variable radius formed between the wall portion 68 and the radially extending face 70. The radius at which rotation of the rotatable grip 18 acts on the operating cable 66 is referred to as the spooling radius. Thus, a slot having a variable radial height is formed between the wall portion 68 and radially extending face 70 to form the spool 72. The radial height of the slot at end 74 of the slot is just slightly larger than the diameter of the cable 66.

A retainer 76 is secured to the end of the cable to prevent it from being pulled through the slot. The spool 72 having dropped away at 78, where the cable 66 exits from the slot, the radial height of the slot is considerably higher than the diameter of the cable. While the cable is shown engaging the radially outward surface of the slot in FIG. 4, when the system is assembled and tension applied to the cable, it rests on the radially inward surface or spool 72 as shown in FIGS. 5 and 6.

With the cable 66 secured in the slot formed in the grip portion 18, and first portion of spring 44 placed in the elongated notch 42, the grip is assembled to the housing 16 in the directions of the arrow in FIG. 4 such that the wall 56 is received in a space 80 between an outer wall 82 of the housing 16 and the spring retaining portion 40. To complete the assembly, a cover 84 is placed over the open portion of the cable guide tube 30 and secured in place by a screw 86 which is threadedly engaged in a hole 88 formed in a projection 90 extending from the housing 16.

Figure 5:
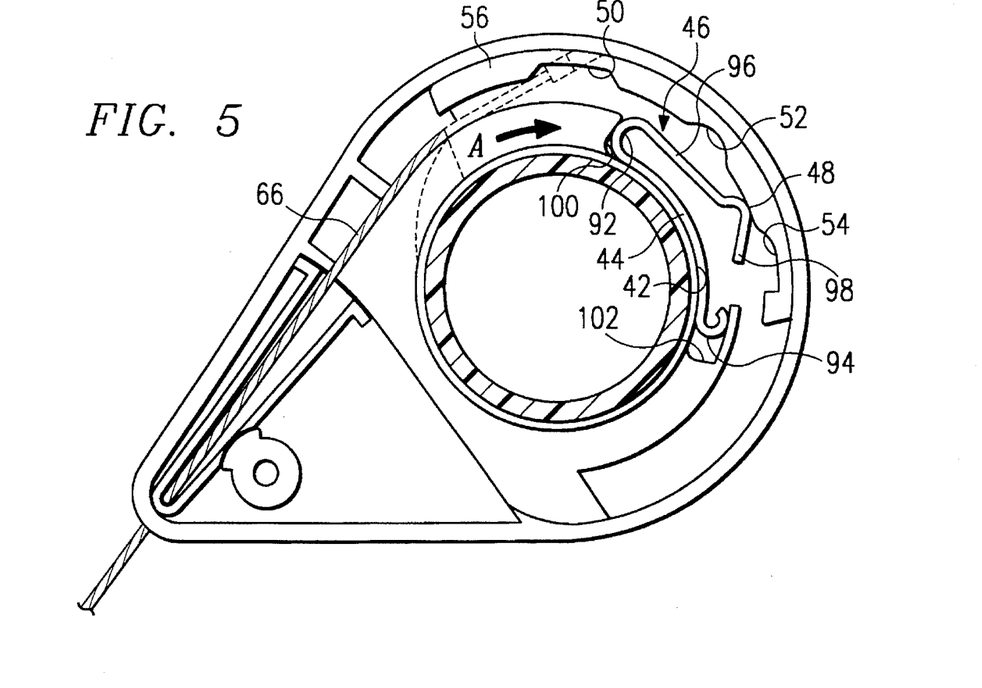
FIG. 5 is a partial cross-sectional view taken along the line 5—5 in FIG. 3, showing the rotatable grip actuating system in accordance with the first embodiment of this invention in a first operative position.
Figure 6:
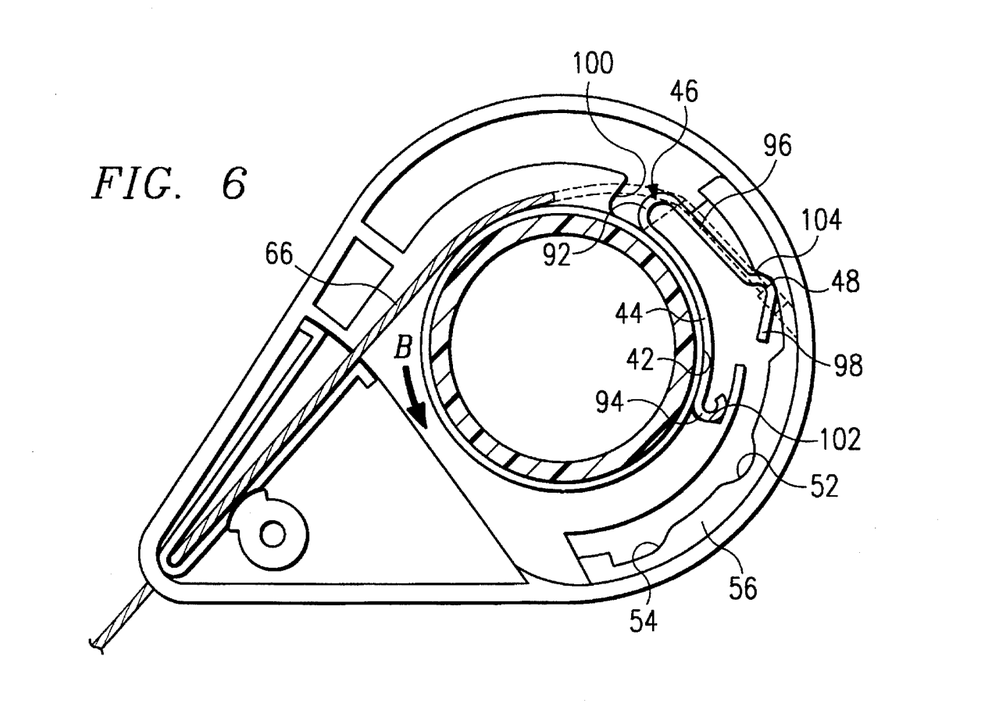
FIG. 6 is a partial cross-sectional view taken along the line 6—6 in FIG. 3, showing the rotatable grip actuating system in accordance with the first embodiment of this invention in a second operative position.

Referring now to FIGS. 5 and 6, the role played by the spring 46 of this invention in the torque required for rotation of, and in defining selected positions of, rotatable grip 18 will be further described. The detent spring assembly portion of the rotatable grip actuating system includes an inward facing generally cylindrical wall 56 in which are formed notches 50, 52 and 54. The number of notches corresponds to the number of positions required for actuation of the derailleur shifting system.

The stationary portion of the rotatable grip actuating system includes the mandrel 20 and a spring retaining member having an outwardly facing generally cylindrical surface in which is formed a spring retaining elongated notch 42. As shown in cross-section in FIG. 5 and 6 and in an isometric view in FIG. 7, spring 46 is formed with a first portion in the form of an elongated base member 44, the first and second ends 92 and 94 respectively of which are formed in a generally semicircular shape. First end or curve 92 is curved at a radius $r_2$ around a center 93; second end or curve 94 is curved in a radius $r_2'$ around a center 95. An arm or linear extension 96 extends from the first end 92 of the spring 46 over the elongated base 44 to give the spring an overall narrow U-shape. Provided at the free end 98 of the arm 96 is a notch engaging outwardly convex, with respect to the base portion 44, bent portion or detent 48, that is curved at radius $r_3$ around a center 97, with radius $r_3$ being smaller that radii $r_2$ and $r_2'$. The free end or straight extension 98 of the arm 96 is bent by this third sharp bend 48 inwardly toward the first or base member 44.

Figure 7:
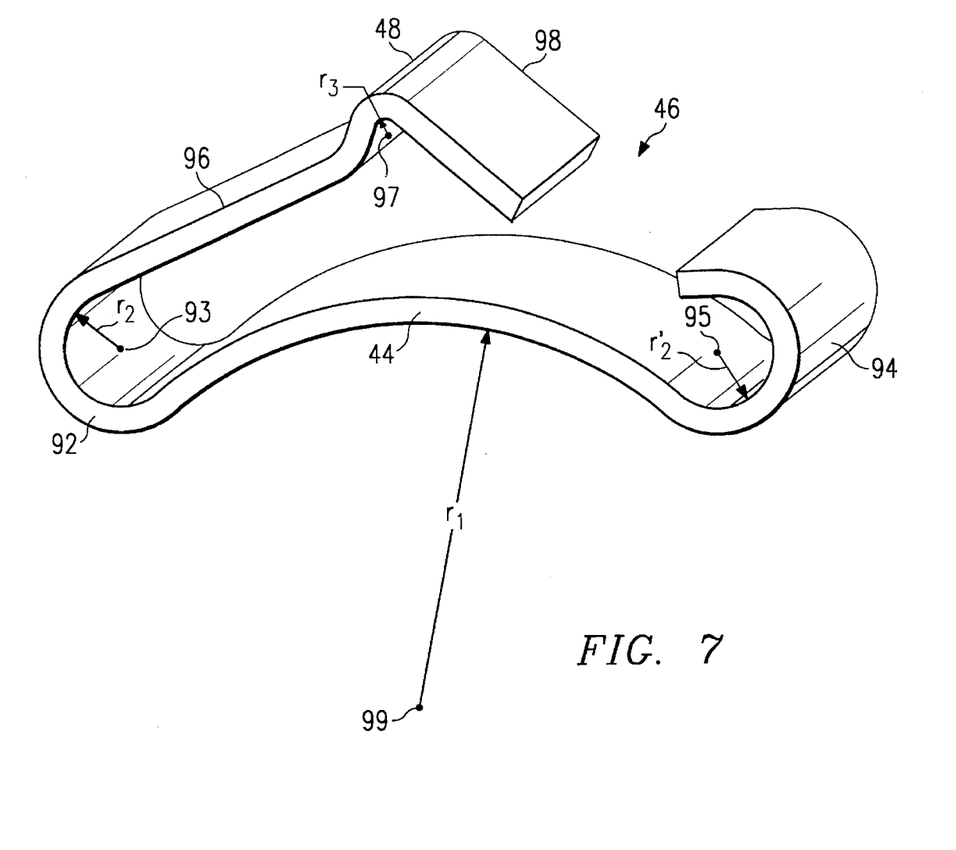
FIG. 7 is an isometric view of a detent spring in accordance with the first embodiment this invention.

The base member 44 of the spring 46 is curved at a radius $r_1$ from a center 99, which is located on the opposite side of spring 46 from centers 93 and 95. Secondary radii $r_2$ and $r_2'$ are substantially smaller than first radius $r_1$. In FIG. 7, radius $r_1$ corresponds to the curvature of the base of the elongated notch 42. As best seen in FIG. 6, the ends or sidewalls 100 and 102 of elongated notch 42 are spaced apart at a greater distance than the distance between the extremities of the curved portions 92 and 94 of the spring. Upon rotation of the cable retaining and engaging portion 64 with respect to the spring retaining portion 40, the spring will be shifted in the elongated notch 42 in the direction of rotation of the spring retaining portion 40, unless either end 100 or 102, which is moving toward respective ends 92 and 94 respectively of the spring, is already in engagement therewith. The end 100 will be in engagement with the first end 92 of the spring as shown in FIG. 5, when the spring retaining portion 40 is rotated by the rotatable grip in the direction indicated by the arrow A. Conversely, when the spring retaining portion 40 is rotated in the direction of the arrow B shown in FIG. 6, end 102 of the elongated notch 42 will be in engagement with the second end 94 of the spring.

Figure 8:
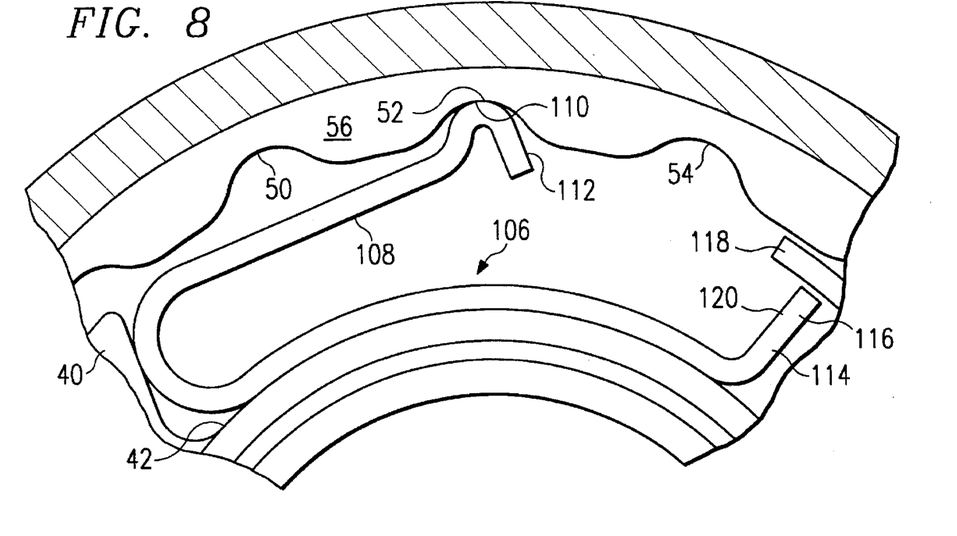
FIG. 8 is an enlarged fragmentary cross-sectional view showing a second embodiment of the detent spring of this invention in a position similar to that shown in FIG. 5.

Due to the notch engaging portion 48 being formed adjacent the free end of the elongated arm 96, the force required to move it in and out of one of the notches or detents 50, 52 or 54, which in the embodiments of FIGS. 5, 6 and 8 are symmetrical about their apices, depends on the direction of rotation. Less force is required to rotate spring retaining portion 40, and therefore, the spring 46 in the direction of the arrow B, in FIG. 6, wherein sloping edge 104 of the detent 48 is engaged by the sloping portion of one of the notches 50, 52 or 54. That is, less force is required to depress the detent 48 and therefore the arm 96 as the detent 48 moves out of a notch. The spring 46 offers greater resistance to rotation in the direction A as shown in FIG. 5. The engagement of the side of the detent 48 which continues as straight extension 98 abuts a sloping edge of a notch 50, 52 or 54 to first apply a force through the arm 96 and the bend 92 to the end or sidewall 100 of the notch. While the detent 48 will eventually be depressed as it moves out of the notch or detent due to continued rotation of the spring retaining portion 40, a greater force is required to do so than for rotation in the direction of arrow B. With the spring 46 so formed, the notches 50, 52 and 54 can be made symmetrical while at the same time providing different degrees of resistance for rotation in opposite directions, thereby equalizing the force of the return spring in the derailleur shifting mechanism.

Because the metal of which the spring 46 is formed has a precisely defined yield point separating elastic and plastic deformation, the spring can be readily designed to operate within its elastic range at all times. Thus, the problem of spring fade experienced with a plastic spring can be eliminated. Further, because the stiffness of the spring can be determined, for instance by varying the thickness of the spring leaf, a spring can be designed which will have a high contact force with the surface between notches when compressed, but a relatively low preload when residing in the notches 50, 52 and 54. To be able to design the spring in this manner is quite beneficial. For instance, the spring may be designed such that the rotatable grip 18 rotates freely in the cable release direction until the detent 48 of the spring meets the front wall of notches 50, 52 or 54, which is the desired cable position for a particular sprocket position.

Insofar as the shape of the base of the notches conforms to the shape of the apex of the detent 48 on spring 46, so as to precisely define a centered position, the curvature of the notch as it merges into the circumferential surface between the notches may have a larger radius, so as to cause less wear on both the detent 48 and the notches and the surfaces of the wall 56 engaged thereby. The torque required for rotating from one pre-determined position to another, can in part be defined by the angle which the sides of the notches 50, 52 and 54 make with the radius of the wall 56 extending between the notches.

Figure 9:
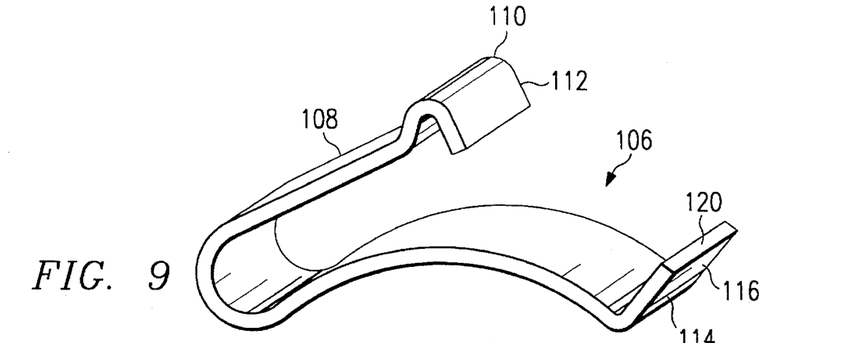
FIG. 9 is an isometric view of the second embodiment of the detent spring of this invention as shown in FIG. 8.

Referring now to FIGS. 8 and 9, a second embodiment of the spring of this invention will be described. The spring 106 is similar to the spring 46 shown in FIG. 4–7, in that the first end of the spring 106 is curved and is provided with an arm 108. Further, a convex bend or detent 110 and extension 112 are formed at the free end of arm 108. The second end 114 of the spring 106 is formed with a radially extending portion 116. The spring retaining member 40 is provided with a circumferentially extending portion or barrier 118 located radially outward and extending over the elongated notch 42 and the free end 120 of the radially extending portion 116 of the spring. In this embodiment, the second end of the spring 114 is prevented from lifting by the engagement of free end 120 with the barrier 118. By thus preventing the lifting of the second end 114 of the spring when the spring retaining member 40 is rotated in either direction with respect to the wall 56, a force applied by the detent 110 as it moves in and out of the notches 50, 52 and 54 may be more precisely controlled.

Figure 10:
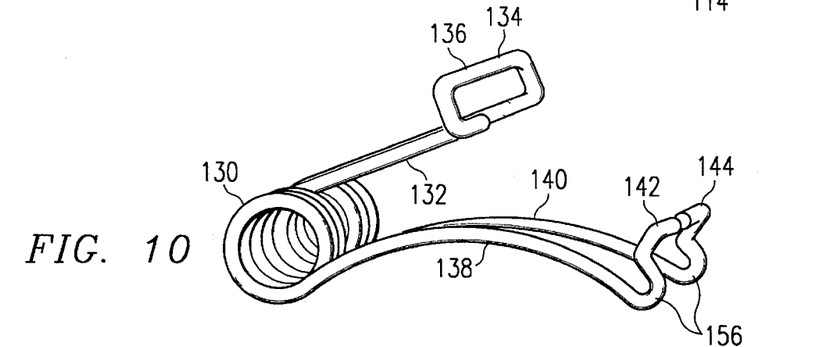
FIG. 10 is an isometric view of a third embodiment of the detent spring of this invention.

Referring now to FIG. 10, still another embodiment of the invention will be described. As shown in FIG. 10, the spring 46 is formed of cylindrical wire. As in the case of the first embodiment shown in FIG. 4–7, and the second embodiment shown in FIG. 8 and 9, the force applied by the spring as it moves into and out of the notches 50, 52 and 54 may be determined by selecting the characteristics of the spring wire including its diameter resilience, etc., and the formation of the spring, including the number of spirals of spring the length of the arm, etc. As shown in FIG. 10, the spring is formed from a single piece of cylindrical spring steel stock. The first end 130 of the spring is formed as a pair of helixes. The inner end of each helix extends as an arm 132 at the ends of which is formed a generally rectangular portion 134. Side 136 of the rectangular portion 134 forms a detent 136 which engages the notches 50, 52, and 54 and the cylindrical surface therebetween. The outer ends of the helixes are formed with arcuate extensions 138 and 140 which form the base of the spring. The radii of portions 138 and 140 may be chosen to be smaller than the radius of the arcuate base surface 152 of notch 42 (see, e.g., FIG. 11) such that only the ends 130 and 156 engage surface 152. Bent portions 142 and 144 are formed at the free ends of the arcuate extension to provide radial extensions similar to that of the embodiment shown in FIG. 8 and 9.

Figure 11:
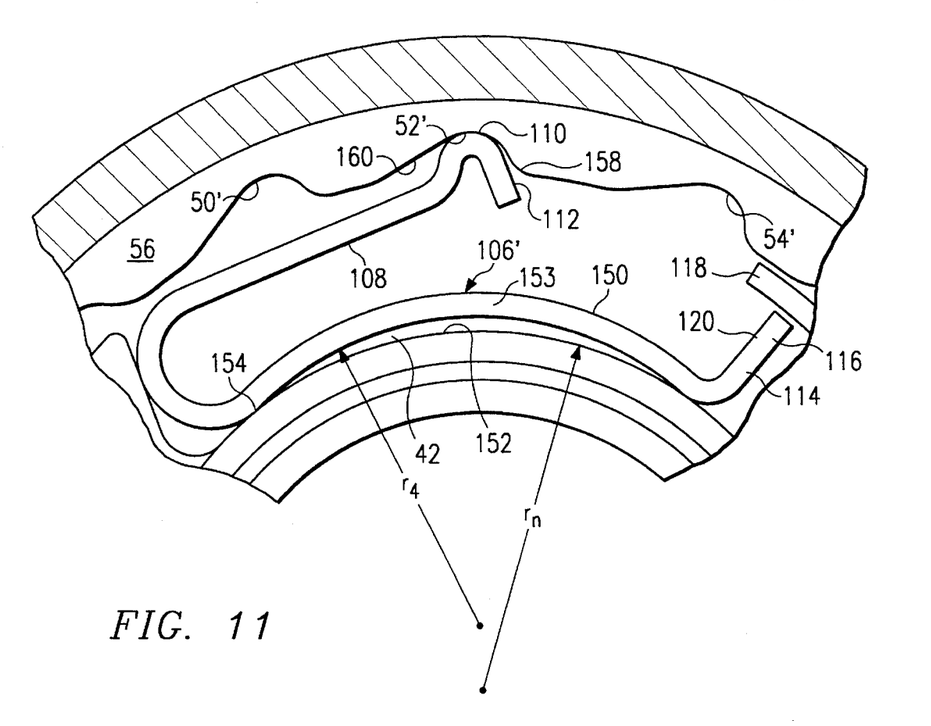
FIG. 11 is an enlarged fragmentary cross-sectional view showing a fourth embodiment of the detent spring of this invention in a position similar to that shown in FIG. 8.

Referring to FIG. 11, a further embodiment of a detent spring according to the invention is shown. This embodiment is similar to the one shown in FIGS. 8 and 9, and for that reason like characters identify like pans. In FIG. 11, a spring 106' is provided with a base 150 that has a radius of curvature $r_4$ that is smaller than the radius of curvature $r_n$ of the arcuate surface 152 of notch 42. Therefore, only the first curved end 154 and the second end 114 of spring 106' engage surface 152, with a middle portion 153 of base 150 being spaced from surface 152.

FIG. 11 also shows notches 50', 52' and 54' having sides which form different angles with respect to the surface of cylindrical wall 56. This is another method by which the notch engaging portion 110 may be made to experience less force when it travels over e.g. side 158, which forms a lesser slope with respect to the surface of wall 56 than opposed side 160.

While preferred embodiments of the invention have been shown, it should be apparent to those skilled in the art that what have been described are considered at present to be preferred embodiments of the rotatable handgrip actuating system of this invention. In accordance with the patent statute, changes may be made in the system without actually departing from the true spirit and scope of this invention. The appended claims are intended to cover all such changes and modifications which fall in the true spirit and scope of this invention.

What is claimed is:

1. A detent spring assembly including a detent spring which cooperates with first and second members, said second member being movable with respect to said first member to define predetermined locations of said members with respect to each other, a first one of said members having an elongated spring-retaining notch for retaining said detent spring, said elongated notch having an elongated base and sidewalls at each end of said elongated base extending toward a second one of said members, a surface on said second one of said members having a series of spaced detent notches formed therein, said spring being formed of spring metal and comprising, an elongated base member having first and second ends, an arm extending from said first end, said arm formed so as to extend over said elongated base member, said arm having a free end, a detent notch engaging portion being formed near said free end, whereby said notch engaging portion engages said surface as said second member is moved with respect to said first member, and moves into one of said detent notches when brought into alignment therewith.

2. The detent spring assembly of claim 1, wherein said first one of said members is formed with a retaining portion spaced from and overlying said elongated base of said elongated notch, said spring being formed with a tab extending from said second end toward said retaining portion, said tab having a free end which engages said retaining portion to maintain said second end of said elongated base of said spring in close proximity to said elongated base of said notch.

3. The detent spring of claim 1, wherein when the movement of the second member with respect to said first member is such that when said second one of said surfaces is moving with respect to said first one of said surfaces in the direction in which the arm extends over said elongated base member, less force is required to move said notch engaging portion out of a notch then when said second member is moved in the opposite direction.

4. The detent spring assembly of claim 1, wherein said surface is cylindrical.

5. A detent spring assembly, comprising:

a first member;

a second member movable with respect to said first member to define predetermined locations of said members with respect to each other;

a detent spring formed of spring metal and cooperating with first and second members;

a first one of said members having sidewalls delimiting an elongated, spring-retaining notch for retaining said detent spring, said spring-retaining notch having an elongated base, said sidewalls extending toward a second one of said members;

a surface on said second one of said members having a series of spaced detent notches formed therein;

an elongated base member of said detent spring having first and second ends, an arm extending from said first end over said elongated base member, said arm having a free end; and a detent notch engaging portion of said detent spring formed near said free end, whereby said notch engaging portion engages said surface as said second member is moved with respect to said first member, and moves into one of said detent notches when brought into alignment therewith.

6. The detent spring assembly of claim 5, wherein said surface on said second one of said members is cylindrical.

7. The detent spring assembly of claim 5, wherein said elongated base member is curved, such that only said first and second ends engage the base of said elongated spring-retaining notch.

8. The detent spring of claim 7, wherein the ends of said elongated base member are formed as curved portions with the centers of the curves located on the opposite side of said elongated base member as the center of the curve of said base member.

9. The detent spring of claim 5, wherein said detent notch engaging portion is formed with a curved surface which is engageable with said detent notches.

10. The detent spring assembly of claim 5, wherein said detent spring is formed from an elongated flat strip of spring metal.

11. The detent spring assembly of claim 5, wherein said detent spring is formed from an elongated piece of metal spring wire.

12. The detent spring assembly of claim 11, wherein said first end of said elongated base member is formed of at least one multiple turn coil of said spring wire.

13. The detent spring assembly of claim 11, wherein said first end of said elongated base member is formed of two multiple turn coils of said spring wire.

14. The detent spring assembly of claim 11, wherein said elongated base member is formed of two side by side curved portions of said elongated metal spring wire, such that only said first and second ends engage the base of said elongated notch.

15. The detent spring assembly of claim 12, wherein said spring wire extends from one end of said coil to form said elongated base member, and from the other end of said coil to form said arm.

16. The detent spring assembly of claim 13, wherein said spring wire extends from one end of each of said coils to form said elongated base member, and from the other end of each of said coils to form said arm.

17. The detent spring assembly of claim 16, wherein said notch engaging portion is formed by a portion of said wire extending between the free ends of said arm forming portions of said spring wire.

18. A detent spring assembly which defines predetermined locations of first and second members with respect to each other comprising, a detent spring, said first and second members having respective first and second surfaces facing each other, said first surface having sidewalls delimiting an elongated spring-retaining notch for retaining said detent spring, said elongated notch having an elongated base, said second surface having a series of spaced detent notches formed therein, said spring being formed of spring metal and comprising,
an elongated base member having first and second ends,
an arm extending from said first end at an angle so as to extend over said elongated base member, said arm having a free end,
a notch engaging portion being located near said free end, whereby said notch engaging portion engages said second surface as said second member is moved with respect to said first member, and moves into one of said detent notches when brought into alignment therewith.

19. The detent spring assembly of claim 18, wherein said first member is formed with a retaining portion spaced from and overlying said elongated base of said elongated notch, and said spring formed with a tab extending from said second end toward said retaining portion, said tab having a free end which engages said retaining portion to maintain said second end of said elongated base of said spring in engagement with said elongated base of said notch.

20. The detent spring assembly of claim 18, wherein said elongated base member is curved, such that only said first and second ends engage the base of said elongated notch.

21. The detent spring assembly of claim 18, wherein said elongated base member is curved, said ends of said elongated base member being formed as curved portions with the centers of the curves located on the opposite side of said elongated base member as the center of the curve of said base member.

22. The detent spring assembly of claim 18, wherein said notch engaging portion is formed with a curved surface which is engageable in said detent notches.

23. The detent spring assembly of claim 18, wherein when the relative movement of one of said first and second members with respect to the other of said first and second members is such that when said second surface having said series of spaced detent notches therein is moving with respect to said first surface in the direction in which said arm extends over said elongated base member, less force is required to move said notch engaging portion out of a detent notch then when one of said members is moved in the opposite direction with respect to the other.

24. The detent spring assembly of claim 18, wherein said first and second surfaces are cylindrical.

25. The detent spring assembly of claim 18, wherein said spaced detent notches formed in said second surface are formed with two sides, said sides being at different angles with respect to said second surface, such that said notch engaging portion may be moved out of said notches with less force when travelling over the side which is at a lesser slope with respect to the second surface.

26. In a twist grip having a first member and a second member rotatable with respect to said first member, one of said first and second members having a spring retaining notch and the other of said first and second members having a detent surface defining at least two detent notches, each of said detent notches having an apex, said detent notches having sloping sides, a spring formed of an elongated piece of spring metal having a base curved at a first radius, and first and second ends curved in respective first and second curves at second radii which are smaller than the first radius and the centers of which first and second curves are on the opposite side of said base, said first end of said spring having a linear extension tangential to said first curve of said first end and having near the end thereof a third sharp bend at a radius smaller than said first and second radii and the center of which is located on the same side of said spring as the center of said first curve, a free end of the sharp bend having a straight extension which projects toward the convex side of said base, whereby said base is received in said spring-retaining notch with the ends of said spring adaptable to engage respective ends of said spring-retaining notch and said third sharp bend engaging said detent surface and dropping into and rising out of said detent notches as said second member is rotated with respect to said first member.

27. The twist grip of claim 26, wherein said sloping sides of each detent notch form angles of different magnitude with respect to the detent surface, such that when the rotation of said second member is such that said third bend engages said side of said notch with the greater angle, less force is required for rotation than when the third bend engages the side having a lesser angle.

28. The twist grip of claim 26, wherein for each detent notch, angles of first and second ones of said sides with respect to the detent surface are predetermined, such that when the external force applied to a cable attached to said rotating member is unequal for opposite directions of rotation, the angles are such that the forces require for rotation of the second member with respect to the first member in either direction are essentially equalized.

29. In a twist grip having a first member and a second member rotatable with respect to said first member, one of said first and second members having a spring-retaining notch and the other of said first and second members having a detent surface defining at least two detent notches, a spring formed of an elongated piece of spring metal having a base, said base having a first end, a middle portion joined to said first end, and a second end joined to said middle portion, said middle portion outwardly displaced with respect to said first and second ends, said first and second ends curved in respective first and second curves having respective first radii and having centers on one side of said base, a linear extension extending from and tangential to the curve of said first end of said base, a third sharp bend formed on said linear extension at a second radius smaller than either of said first radii and curved on a center on the same side of said base as said first curve, a free end of said sharp bend pointing toward said base, whereby said base is received in said spring-retaining notch with each end of said base adaptable to engage a respective end of said spring-retaining notch and said third sharp bend is adaptable to engage said detent surface and to drop into and rise out of said detent notches as said second member is rotated with respect to said first member.

30. The spring of claim 29, wherein said first end of said base engages a respective end of said spring-retaining notch at a different time than when said second end of said base engages the other end of said spring-retaining notch.

31. The twist grip of claim 29, wherein said sharp bend which engages the detent notches pivots about the first end of said base, such that as said second member is rotated with respect to said first member, rotation in the direction of extension of the linear extension from the sham bend to the first end of said base requires less force to raise said sharp bend out of a detent notch than rotation in the opposite direction.

* * * * *